Sept. 10, 1968  J. J. BOOTH ET AL  3,400,551

SLUSH BEVERAGE MACHINE

Filed June 28, 1967  3 Sheets-Sheet 1

INVENTORS
JACK J. BOOTH
WILLIAM C. BRANCH

Richard Harris
& Hubbard
ATTORNEY

Sept. 10, 1968  J. J. BOOTH ET AL  3,400,551
SLUSH BEVERAGE MACHINE
Filed June 28, 1967  3 Sheets-Sheet 2

INVENTORS
JACK J. BOOTH
WILLIAM C. BRANCH
ATTORNEY

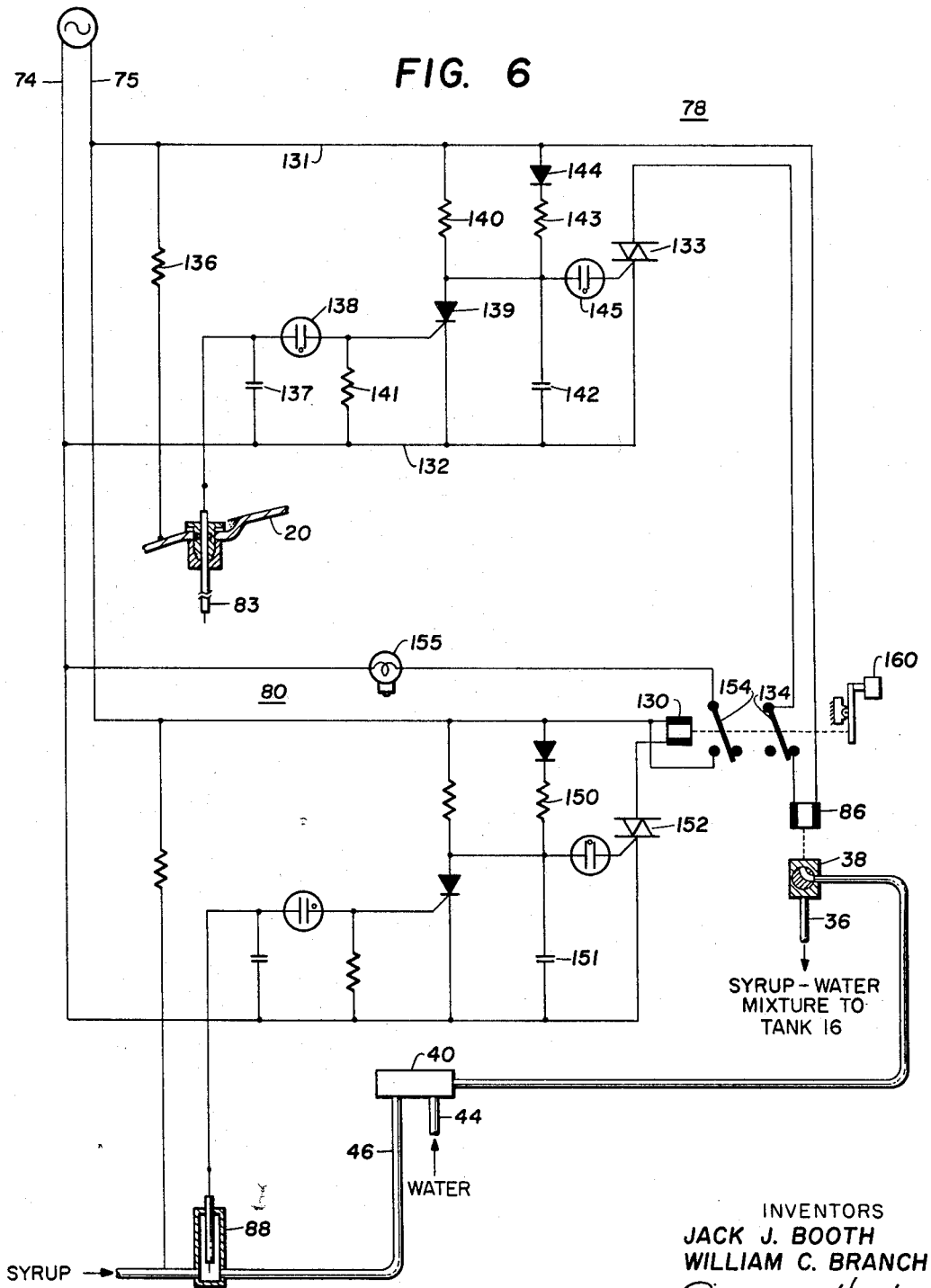

United States Patent Office 3,400,551
Patented Sept. 10, 1968

3,400,551
SLUSH BEVERAGE MACHINE
Jack J. Booth, 5006 Tanbark 75229, and William C. Branch, 6730 Greenwich Lane 75230, both of Dallas, Tex.
Filed June 28, 1967, Ser. No. 649,541
11 Claims. (Cl. 62—135)

ABSTRACT OF THE DISCLOSURE

A slush bank is formed in a tank wherein liquid introduced at the tank bottom is mixed with diffused carbonation gas and frozen to slush under predetermined gas pressure while circulated by an impeller. Temperatures within the tank are maintained within a very narrow range in order that a bank of slush is established and maintained with relatively low energy transfer rates.

Field of the invention

This invention relates to apparatus for producing slush beverages, and more particularly to apparatus wherein liquid is maintained under carbonation gas pressure during transfer of energy thereto from a small heat pump to form and maintain a slush bank.

Prior art

Systems have heretofore been developed wherein carbonated beverages are maintained in tanks at pressures above atmospheric pressure and at temperature such that the carbonted beverage is not frozen. When such a beverage is suddenly discharged into an area of atmospheric pressure, a slushy beverage is provided due to expansion of the gas entrained therein. Illustrations of such systems may be found in U.S. Patent No. 3,044,878 to Knedlik and U.S. Patent No. 3,108,449 to Lents. Such systems have generally required refrigeration systems with relatively large compressor units, and have often required continuous agitation and sensitive temperature control in order to prevent freezing of the beverage inside the pressurized tank. Further, heretofore developed systems for producing slushy carbonated beverages have often required the introduction of excessive amounts of carbonated gas in order to prevent freezing of the beverage inside the tank.

Summary

In accordance with the present invention, a system is provided wherein a relatively small refrigeration compressor is employed in combination with a tank operated at generally low gas pressure to produce a slushy beverage. A selected pressure is maintained on a liquid which is introduced into the bottom of a cylindrical tank and is mixed with diffused carbonation gas. A refrigeration unit freezes the liquid to a slush bank, which is selectively dispensed. An impeller removes the frozen particles from the area of the refrigerated walls and maintains the frozen particles in a stratified slush bank in the upper regions of the tank. A temperature control element in the region of the fluid inlet to the tank maintaining the temperature of the frozen particles within a narrow temperature range and a pressure operated vent permit establishment and maintenance of a slush bank of uniform character.

The drawings

For a more complete understanding of the present invention and for further objects and advantages thereof, reference may now be had to the following description taken in conjunction with the accompanying drawings in which:

FIGURE 6 is a schematic diagram of the present level sensing system.

The preferred embodiments

Figure 1:
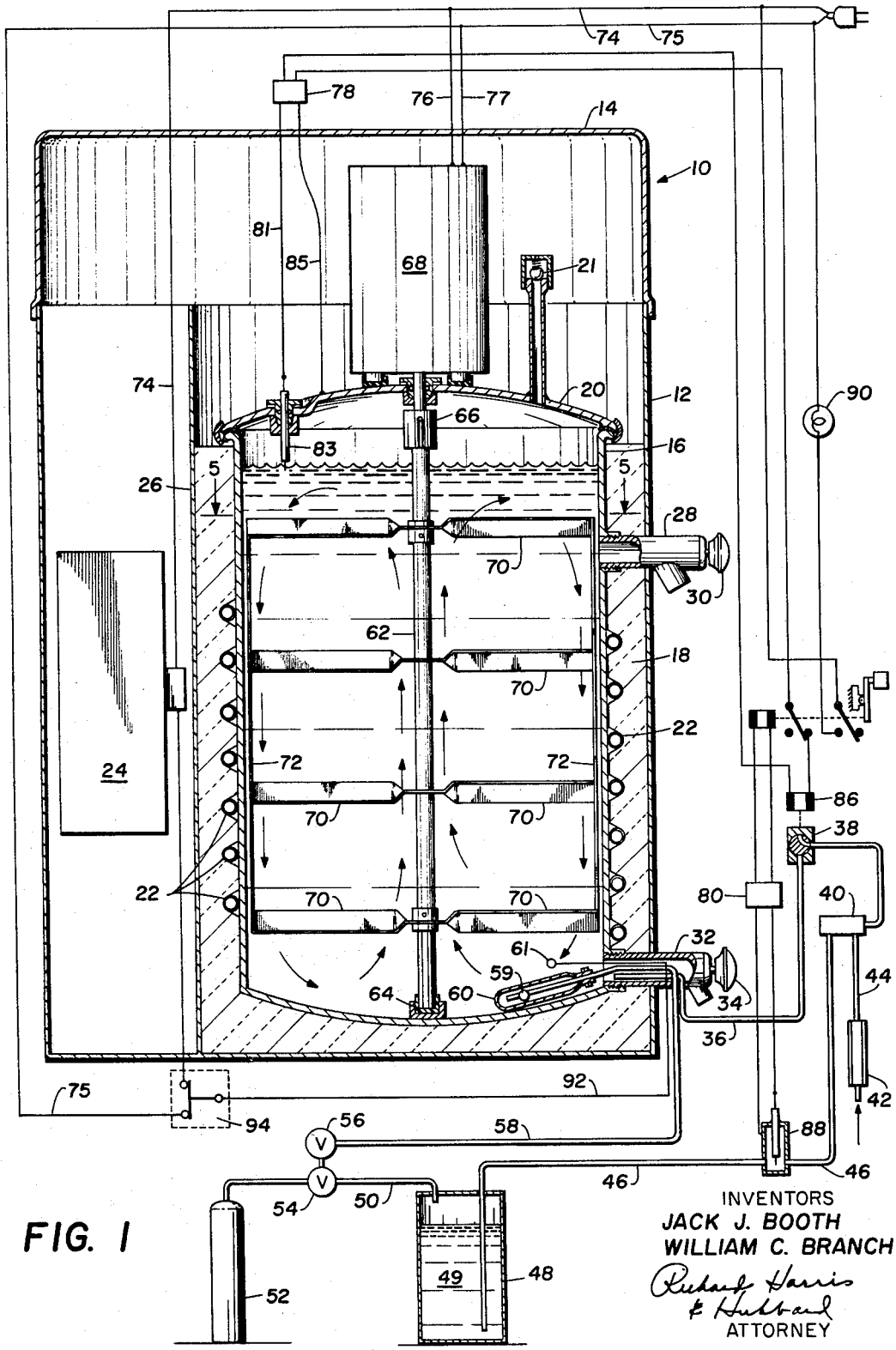
FIGURE 1 is a somewhat diagrammatic view of a system according to the present invention.

Referring to FIGURE 1, a slush beverage machine designated generally by the numeral 10 includes a cylindrical main body 12 having a top 14. A pressurized tank 16 is supported inside the body 12 and surrounded by suitable insulating material 18. The pressurized tank 16 includes a top member 20 which may be sealingly attached and which includes a spring loaded relief valve 21. A nnumber of turns of cooling coils 22 are disposed about the outer circumference of the tank 16 and are connected to a suitable refrigeration unit 24. The cooling coils 22 are disposed about the lower half of the tank 16 to provide greatest cooling in the bottom region of the tank. The refrigeration unit 24 includes a compressor and the like, and is disposed within a chamber formed in the main body 12 by a dividing wall 26.

A dispensing spout 28 is located near the top of the tank 16 and includes a manually operable knob 30 which may be actuated to dispense a beverage from tank 16. A similar spout 32 is disposed near the bottom of tank 16 and includes a manually operable knob 34 for selectively draining the contents of the tank when desired. Beverage liquid may be introduced into the bottom of the tank 16 through the conduit 36 which passes through the bottom of spout 32. Conduit 36 is connected through a solenoid valve 38 to a mixing block 40, to be later described in detail.

The mixing block 40 mixes a supply of water, which is supplied through a filter 42 and a conduit 44, with a beverage syrup which is supplied through the conduit 46 from the syrup supply tank 48. Syrup 49 in the supply tank 48 is forced out through conduit 46 by pressure exerted by pressurized carbonation gas fed through conduit 50 from source 52. A regulator valve 54 provides a relatively high pressure of carbonation gas to tank 48 to force syrup from tank 48 when the control valve is opened.

A continuous flow of lower pressure carbonation gas from the source 52 is fed directly into the pressurized tank 16 through a regulator valve 56 and a conduit 58. A check valve 59 is disposed near the end of conduit 58. A porous bulb 60 is connected to the end of conduit 58 so that carbonation gas is diffused into a plurality of pinpoint bubbles which are more easily absorbed by the beverage liquid in the bottom of the pressurized tank 16. The porous bulb 60 may be made from any one of a plurality of suitable materials, such as porous stone, a porous plastic tube or the like. A temperature sensing element 61 is adjacently disposed to the porous bulb 60 in order to sense the temperature of the beverage liquid in the bottom region of the pressurized tank 16.

Figure 2:
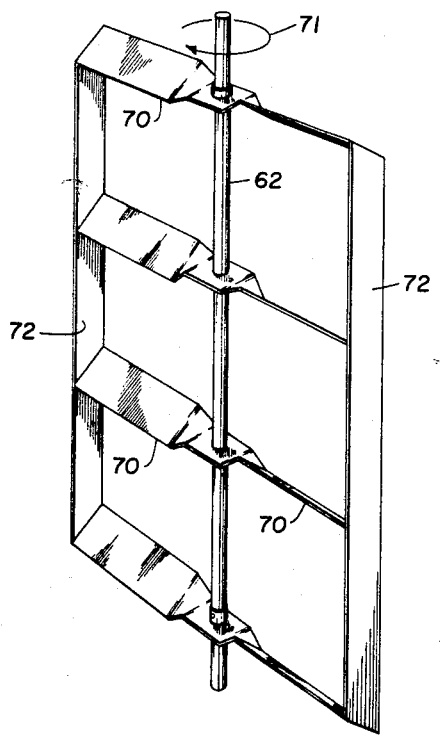
FIGURE 2 is a view of a rotary impeller for use in the present invention.
Figure 5:
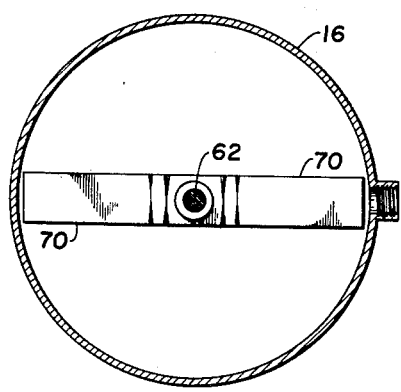
FIGURE 5 is a sectional view taken generally along the section lines 5—5 of FIGURE 1.

A rotating impeller is provided inside tank 16 and includes a shaft 62 journaled in suitable bearings in suitable bearings 64 for rotation through a connection 66 by an electric motor 68. Attached along the length of shaft 62 and extending radially outwardly therefrom are a plurality of impeller vanes 70. As may be best seen in FIGURE 2, the vanes 70 have inclined flange portions of opposite slopes. Thus, rotation of the shaft 62 in the direction of the arrow 71 will cause the carbonated beverage mixture inside the pressurized tank 16 to tend to circulate upwardly in the center to the top regions of tank 16. A pair of parallel side bars 72 are connected to the ends of each of the vanes 70. As shown in FIGURE 5, the bars 72 do not touch the side walls of the pressurized tank 16, but are disposed very closely thereto in order to tend to remove any frozen particles from the region of the walls of tank 16.

It is important in the practice of the invention to circulate the frozen particles along the sides of tank 16 to an upper region of the tank to provide a stratified slush bank near the dispenser spout 28. An impeller of the type shown in FIGURE 2, rotating at approximately 30 r.p.m. having vanes 2.5 inches in width and inclined at 30°, has been found to work well in practice in combination with a 12 inch diameter pressurized tank.

In operation, the pressurized tank 16 is filled with a predetermined quantity of mixture of beverage, liquid, and water. Refrigeration is provided through the coils 22 to the walls of the pressurized tank 16. The present device maintains a selected temperature, preferably between 25 and 26.5° F., sufficient to freeze the portions of the beverage mixture in the region of the wall. Motor 68 continuously rotates the vanes 70 of the impeller inside the pressurized tank 16 to continuously remove the frozen particles, whereby the frozen particles tend to move along the tank walls to the region of the dispenser spout 28 to form a stratified slush band. Upon manual depression of the knob 30, the slush beverage is dispensed through spout 28. It will be understood that while FIGURE 1 illustrates movement of the frozen partices downwardly along the sides of the tank and upwardly through the center of the tank upon rotation of the impeller in the direction of arrow 71, that a suitable stratified slush bank could be formed in the upper regions of tank 16 by reverse rotation of the impeller. Such reverse rotation would cause circulation of the frozen particles downwardly through the middle of the tank and upwardly along the sides of the tank. The maintenance of an upper stratified slush bank enables a consistently uniform drink to be dispensed, even though a mixture of additional syrup and water is being introduced in the bottom regions of the tank. In some instances, the slush bank may build up and exist substantially throughout the length of the tank 16.

Carbonation gas under pressure from the source 54 is supplied through the syrup in the tank 48 and the mixing block 40, where the syrup is mixed in desired proportions with water. This mixture flows through the conduit 36 directly into the bottom of the pressurized tank 16. Carbonation gas under pressure is diffused throughout the bottom region of the pressurized tank 16 through the porous bulb 60. The flow of carbonation gas diffused therethrough will be absorbed by the mixture in the bottom regions of tank 16. The valve 21 located in top 20 of the tank 16 will open upon the advent of a pressure over a predetermined magnitude, which may preferably be about 22 p.s.i. The valve 21 serves to control the uniformity of the Brix, the water to syrup ratio. More particularly, when the material freezes it expands. This tends to increase pressure. When pressure increases, less syrup flows into the tank, thereby decreasing the water to syrup ratio or the "Brix," as it is well known in the art.

By use of the valve 21, the variations in pressure in the tank are minimized so that the Brix will be held within limits which are predetermined. Thus there results a more uniform product.

It will thus be understood that carbonation gas is being provided to the present system continuously through the porous bulb 60, with the mixture of syrup and water being added to the tank 16 as needed. In practice, the pressure applied to the carbonation gas being supplied continuously through the conduit 58 preferably is of the order of about 20 p.s.i., while the pressure of the gas in conduit 50 will be of the higher magnitude of about 30 p.s.i. Because of the close control of temperatures maintained in the tank 16 only a relatively small compressor is required in refrigeration unit 24. In practice, only a ⅓ HP compressor has been required, whereas prior units of similar beverage dispensing rate have required two horsepower units.

Referring again to FIGURE 1, electric power is supplied through lines 74 and 75 from a suitable source of alternating current. The motor 68 is directly connected across the source of power by wires 76 and 77. A level control circuit 78 is connected through wire 81 to an elongated electrode 83 and through wire 85 to the case in order to provide a ground.

The electrode 83 senses the level of the beverage in tank 16. When the level of the beverage drops to a level where electrode 83 no longer contacts the beverage liquid, a control circuit is actuated after a predetermined interval to open valve 38. More particularly, a suitable switch is activated in the flow control circuit 80 to initiate flow to tank 16. As a result, a mixture of syrup and water flows from the mixing block 40 through conduit 36 into tank 16. The level of the beverage inside the tank 16 will thus be raised.

When the fluid level inside tank 16 reaches the electrode 83, the switch in the control circuit is tripped to de-energize the solenoid 86 to stop the flow of liquid to tank 16.

More particularly, a syrup sensor 88 is located in the conduit 46 to sense the flow of syrup through the conduit 46 when the relay 86 is actuated to open valve 38. When the syrup in supply tank 48 is exhausted, sensor 88 senses absence of liquid in conduit 46 and provides control over the solenoid 86 in order to cut off the flow of liquid through the conduit 36. This prevents the addition of only water from conduit 44 to tank 16. When the syrup supply tank 48 is empty, a signal light 90 will indicate to the operator of the device that a new supply of syrup needs to be provided.

An embodiment of the control circuit is shown diagrammatically in FIGURE 6. Where consistent, like parts have been given the same reference characters as in FIGURE 1. Line 74 and 75 supply electrical power to two similar circuits 78 and 80. The circuit 78 serves to control solenoid 86 in response to the presence or absence of liquid on the probe 82 which is mounted in the lid 20. The circuit 80 controls the application of power to a relay 130 depending upon the presence or absence of syrup in the sensor 88.

The circuit 78 includes a line 131 extending from line 75 to one terminal of solenoid 86. Line 132 extends from line 75 by way of a solid state switching device 133 and thence by way of a relay control switch 134 to the second terminal of the solenoid 86. The device is a triac device, conductive bidirectionally when suitably actuated by a control voltage applied thereto. The triac may be of the type manufactured and sold by RCA as Triac No. 40526. In accordance with the present invention, a control circuit is provided for the triac 133. A delay is introduced after the liquid level recedes below the probe 83 before actuating the solenoid 86. More particularly, a resistor 136 connects the line 131 to the lid 20 or to another suitable ground terminal. Probe 83 is connected to line 132 by way of a capacitor 137. Probe 83 is also connected to one terminal of a neon discharge tube 138. The second terminal of the tube 138 is connected to the gate terminal of a silicon controlled rectifier 139. A suitable unit for rectifier 139 would be of the type manufactured and sold by General Electric Company as SCR-C 106-B2. The cathode of the rectifier 139 is connected to conductor 132. The anode is connected by way of resistor 140 to line 131. The gate terminal is connected to terminal 132 by way of resistor 141.

A control condenser 142 is connected in series with resistor 143 and rectifier 144, the series circuit thus found being connected between lines 131 and 132. The juncture between condenser 142 and resistor 143 is connected to the anode of the rectifier 139 and to one terminal of a neon discharge tube 145. The other terminal of tube 145 is connected to the gate terminal of the triac 133.

In operation, the condenser 142 is charged at a rate dependent upon the time constant of the series circuit and thus primarily upon the relative values of resistor 143 and condenser 142. In operation, condenser 142 begins charging through rectifier 144. When the condenser voltage reaches a value to fire the tube 145, the triac 133 begins to conduct. When triac 133 conducts, the solenoid 86 is energized to open valve 38 thereby causing flow of syrup-water mixture through tube 36 to tank 16. When the liquid level in the tank rises such that it touches the bottom of the probe 83, the capacitance in the circuit of the discharge tube 138 is such that the rectifier 139 will be fired. This discharges condenser 142. Thereafter rectifier 139 conducts on each cycle of the alternating current voltage applied thereto. The condenser 142 will be maintained substantially discharged. Thus, as long as the liquid is in contact with the probe 83, there will be no conduction through the triac 133 and the valve 38 will remain closed.

In accordance with the present invention, the time constant of the firing circuit for the triac 133 is of several seconds duration. In one embodiment, the resistor 143 was 15,000 ohms and the condenser 142 was 50 microfarads. The presence of resistor 140 assures positive turn-off of rectifier 139 upon reversal of the A.C. potential thereacross and places a negative potential on the rectifier 139 so that it cannot conduct. The resistor 136 is relatively high so that the lid 20 will not be at any substantial A.C. potential. In a preferred embodiment, the time constant of the circuit 78 is such that the valve 38 will open three to five seconds after the liquid level recedes below probe 83.

The circuit 80 is similar to that of circuit 78 in most respects except that the time constant of the circuit, including the resistor 150 at the condenser 151 may be much shorter, and in some instances may be eliminated. However, in this case, the circuit is responsive to the presence or absence of syrup in the sensor 88. When no syrup is present, the triac 152 is fired to energize relay 130. Relay 130 controls the switch 134 and a second switch 154. The switch 134 is in the energization circuit for the valve solenoid 86. The switch 154 is connected in the circuit for a signal lamp 155. Lamp 155 is energized when the syrup supply is exhausted. The opening of switch 134 accompanies the closing of switch 154 to prevent flow of water to the tank 16. An operator, in response to energization of lamp 155, will then replenish the supply of syrup. When this is completed, a push button 160 may be actuated mechanically to reclose the switch 134, thereby opening the valve 38 to initiate flow. The push button 160 will be depressed manually until such time as the syrup flows in the sensor 88. This condition will have been achieved when, upon release of the button 160, the light 155 remains de-energized.

By reason of the control thus afforded and by reason of the presence of the control valve 21, there may be variations in level and character of material in tank 16 without materially affecting the Brix thereof. Thus the system may be maintained in operation substantially entirely automatically while assuring constancy in the quality of the product.

A control circuit for the operation of the refrigeration unit 24 is also provided in the present invention. The temperature sensitive device 61 is connected through cable 92 to a suitable switch 94 which may provide either an open or closed circuit between the power lines 74 and 75 in order to control the operation of the refrigeration unit 24. In the position of the switch 94, illustrated in FIGURE 1, the temperature of the liquid in tank 16 is such that refrigeration is required. Switch 94 thus has a completed circuit between the power lines 74 and 75 in order to cause operation of the refrigeration circuitry 24. When the temperature sensitive device 61 provides an indication that a sufficiently low temperature has been provided, the switch 94 will open the circuit between the power lines 74 and 75 in order to stop the operation of the refrigeration circuitry 24.

Figure 3:
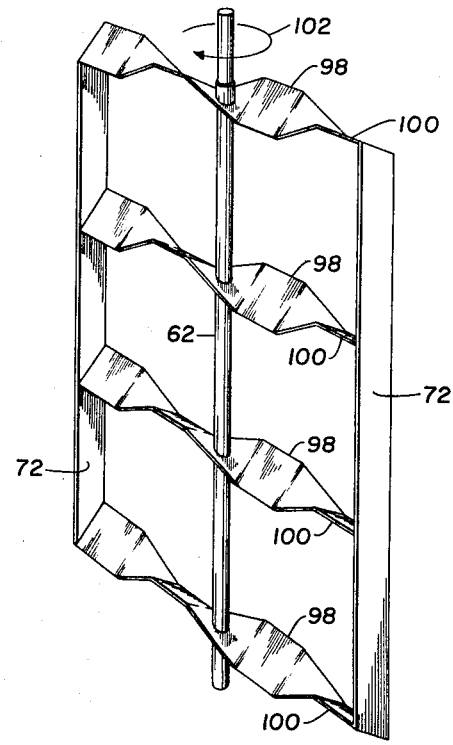
FIGURE 3 is a view of a second embodiment of a rotary impeller for use in the present invention.

FIGURE 3 illustrates a second embodiment of a rotary impeller for use in the present invention, wherein each vane radially extending from the shaft 62 includes two inclined flange portions 98 and 100 which slant in opposite directions. The particular configuration of the rotary impeller shown in FIGURE 3 causes, upon rotation of the impeller in the direction of arrow 102, the frozen particles near the side walls of tank 16 to be dislodged and moved toward the center region of the tank. The side portions 72 in combination with the inclined flange portions 100 act to move the frozen particles from the tank side walls and downward along the tank walls. The rotating action of the inclined flange portions 98 in the center region of tank 16 causes the frozen particles to move upward in the center portion of the tank 16, thus maintaining a fairly uniform two-phase mixture throughout tank 16.

Figure 4:
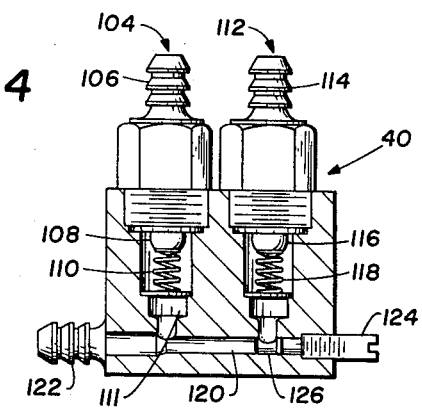
FIGURE 4 is a detailed view of a liquid mixing block for use in the present system.

FIGURE 4 illustrates in detail the construction of the mixing block 40 which includes a first inlet 104 having a ridged portion 106 adapted to be connected to receive water through the conduit 44 (FIGURE 1). A check valve disposed in inlet 104 includes a ball valve member 108 which is upwardly biased by a spring 110 in order to allow only a one-way flow through inlet 104. The rate of flow of water is controlled by a flow control washer 111 which maintains a constant flow rate over the range of pressures normally encountered in city water lines, i.e., a flow rate of from ¼ to ½ gallon per minute, where pressures range from 30 p.s.i. to 100 p.s.i.

A second inlet 112 includes a ridged portion 114 for connection to the conduit 46 through which syrup is supplied. A ball valve 116 is upwardly biased by a spring 118 in order to provide a check valve to prevent backflow through the inlet 112. An outlet 120 is perpendicularly provided through the rectangular mixing block 40 to the inlets 104 and 112 and opens into a ridged nozzle 122 for connection to conduit 36 (FIGURE 1). A screw 124 is threadedly received in one end of the outlet 120 and includes a projection 126 which may be disposed between the opening of the inlet 112 into outlet 120. The position of projection 126 controls the amount of syrup which is mixed with the water supplied through the inlet 104. By retraction of the screw 124, the projection 126 will be moved away from the inlet 112, thereby allowing a greater amount of syrup to be mixed with the water. If desired, a control washer similar to washer 111 may be utilized to control the flow of syrup in place of the screw 124. In such case, the flow of syrup would be regulated to approximately ⅕ the flow allowed in the water inlet.

It will thus be understood that the present invention provides a slush machine wherein relatively low carbonation pressure is normally employed, in combination with relatively low power refrigerating components, in order to freeze portions of the liquid inside the pressurized tank to establish and maintain a stratified slush bank in the upper regions of the tank. Improved contact of carbonation gas and the liquid inside the pressurized tank is obtained through the utilization of a porous bulb. Circuitry is provided to selectively control the operation of the refrigerating unit, in addition to control of the introduction of additional beverage into the unit while maintaining within predetermined limits the syrup-water ratio.

Whereas the present specification has been described in considerable detail with respect to preferred embodiments of the present invention, it is to be understood that this description is for purposes of illustration, and that changes or variations may be made by persons skilled in the art without departing from the scope of this invention as set forth in the appended claims.

What is claimed is:
1. In a system for producing a slushy drink, the combination which comprises:
  (a) a vertically disposed cylindrical tank having walls and an inlet for receiving liquid in the bottom therein and having an outlet port near the top,
  (b) means for introducing carbonation gas under pressure into said tank near the region of said inlet for absorption by said liquid,
  (c) means for maintaining said gas in said tank above atmospheric pressure,
  (d) refrigeration means including coils disposed about said tank for freezing said liquid to slush,
  (e) impeller means having vanes so inclined and rotatable in said tank to circulate said liquid with said carbonation gas downward along the walls of said tank and upward in the center of said tank to maintain a stratified slush bank in at least the upper regions of said tank, and
  (f) temperature sensor for sensing liquid temperature and controlling said refrigeration means to maintain said slush bank of frozen particles within a selected narrow temperature range at and slightly below the freezing point of water at the pressure within said tank.

2. The combination defined in claim 1 and further comprising a level control means for introducing additional liquid into said cylindrical tank upon withdrawal of a portion of said slush bank of frozen particles through said outlet port and a pressure relief valve in said tank for limiting the pressure in said tank to maintain substantially constant the syrup-water ratio in the presence of changes in quantity and character of the contents of said tank.

3. The combination defined in claim 1 wherein all means for introducing carbonation gas comprises:
  a permeable diffusion chamber disposed near the region of said inlet for dividing gas flow into a plurality of pinpoint bubble streams through said liquid for absorption thereby.

4. The combination defined in claim 3 wherein said diffusion means comprises:
  a bulb having a fixed orifice and porous outer walls disposed in the region of said inlet,
  conduit means connecting said fixed orifice of said bulb to a source of carbonation gas,
  whereby pinpoint bubble streams of the carbonation gas will diffuse through said porous outer walls into said liquid.

5. The combination defined in claim 1 wherein said impeller means comprises:
  a rotatable shaft disposed generally along the longitudinal axis of said tank,
  a plurality of vanes laterally extending from two sides of said shaft and each having inclined flange portions to move frozen particles from the region of the walls of said tank along the walls of said tank.

6. The combination defined in claim 1 and further comprising a pressure relief valve disposed through the upper portion of said cylindrical tank for venting the pressure in said tank when the pressure increases above a predetermined magnitude to control the syrup-water ratio in said tank.

7. The combination of claim 1 and further comprising:
  means for providing a supply of syrup to said inlet of said cylindrical tank, and
  means responsive to the absence of syrup in the flow line leading into said tank for terminating the supply of water when the supply of syrup is exhausted.

8. The combination defined in claim 1 and further comprising:
  (a) a supply of beverage liquid,
  (b) means for providing two supplies of carbonation gas under different pressures, one of said supplies being fed directly into the bottom of said tank, and
  (c) means for feeding the other of said supplies of carbonation gas to force said liquid supply into the bottom of said tank.

9. The combination defined in claim 1 and further comprising:
  (a) a first inlet for connection to a supply of beverage liquid such as syrup,
  (b) a second inlet for connection to a water supply,
  (c) one-way valves disposed in each of said inlets for allowing liquid flow in only one direction, and
  (d) an outlet communicating with both of said inlets and said tank.

10. The combination defined in claim 9 and further comprising flow control means interposed in at least one of said inlets for controlling the amount of liquid flow therethrough.

11. The combination defined in claim 10 wherein said first and second inlets extend parallel from one side of a mixing block, and wherein
  said outlet extends through said block perpendicularly to said inlets while communicating with the same, and
  said flow control means includes means disposed in said outlet and adjustable to control the flow path in said outlet between said first inlet and said second inlet.

References Cited
UNITED STATES PATENTS

| | | | |
|---|---|---|---|
| 1,519,746 | 12/1924 | Valerius | 62—69 X |
| 2,134,787 | 11/1938 | Hartman | 62—70 |
| 2,531,315 | 11/1950 | Wyllie | 62—306 X |
| 2,849,868 | 9/1958 | Anderson | 62—342 |
| 3,004,398 | 10/1961 | Mullins | 62—342 X |
| 3,180,110 | 4/1965 | Dunn | 62—354 X |
| 3,240,395 | 3/1966 | Carver | 62—390 X |

ROBERT A. O'LEARY, *Primary Examiner.*

W. E. WAYNER, *Assistant Examiner.*